United States Patent
Omi

[19]

[11] Patent Number: 5,903,408
[45] Date of Patent: May 11, 1999

[54] DATA RECORDING/REPRODUCING APPARATUS HAVING TRACK INTERFERENCE REDUCTION MECHANISM

[75] Inventor: Takao Omi, Kamakura, Japan

[73] Assignee: Kabushiki Kaisha Toshiba, Kawasaki, Japan

[21] Appl. No.: 08/638,153

[22] Filed: Apr. 26, 1996

[30] Foreign Application Priority Data

Apr. 28, 1995 [JP] Japan .................................... 7-106575

[51] Int. Cl.⁶ ................................................. G11B 15/46
[52] U.S. Cl. .................................. 360/73.03; 360/77.02; 360/99.08; 369/44.32
[58] Field of Search ............................. 360/77.02, 77.04, 360/77.03, 77.11, 73.03, 99.08, 98.07; 369/44.26, 44.32

[56] References Cited

U.S. PATENT DOCUMENTS

| | | | |
|---|---|---|---|
| 4,775,966 | 10/1988 | Miura et al. ..................... | 360/77.03 X |
| 4,905,109 | 2/1990 | Bartlett et al. ................... | 360/77.03 X |
| 5,072,318 | 12/1991 | Yu ........................................ | 360/77.02 |
| 5,617,267 | 4/1997 | Kawagoe et al. ................. | 360/98.07 X |
| 5,710,678 | 1/1998 | Leuthold et al. .................... | 360/99.08 |

Primary Examiner—Andrew L. Sniezek
Attorney, Agent, or Firm—Pillsbury Madison & Sutro LLP

[57] ABSTRACT

The invention provides a data recording/reproducing apparatus for recording and reproducing data on and from a disklike recording medium while rotating the disklike recording medium by a spindle motor having ball bearings. In this apparatus, the ratio of the number of revolutions (the frequency of a minimum-frequency vibration component of a non-repeatable vibration) of each ball in the ball bearings, to the number of rotations (the rotational frequency) of the spindle motor is substantially set to 1/n, and servo track writing is performed in synchronism with every n rotations of the spindle motor.

12 Claims, 4 Drawing Sheets

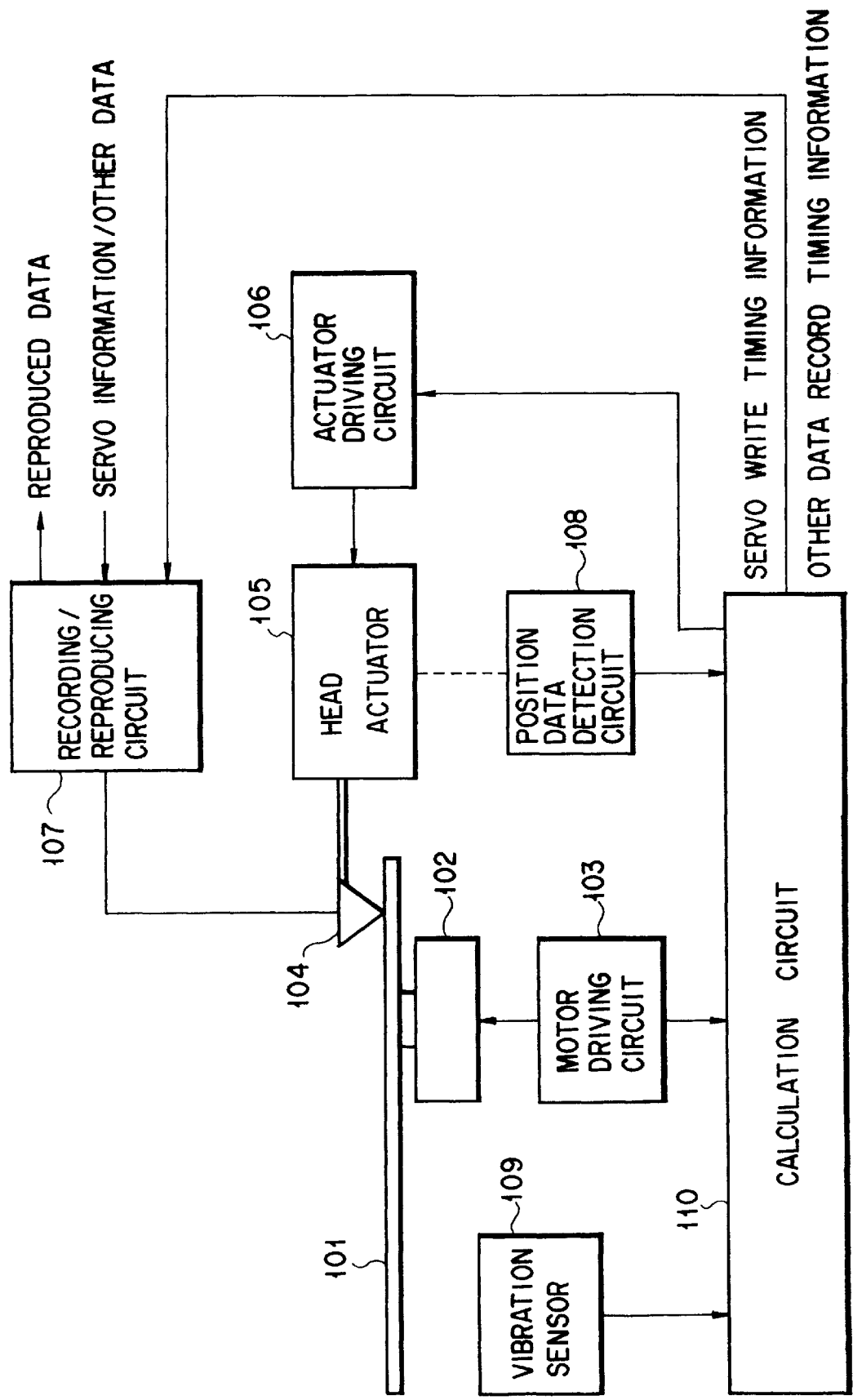
F I G. 1

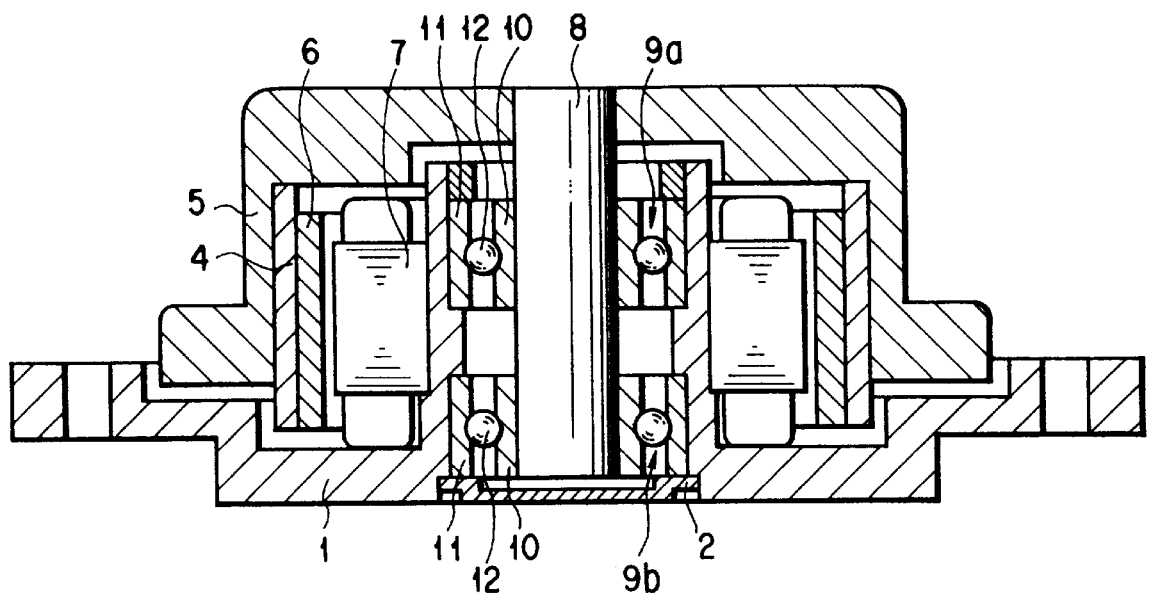
F I G. 2
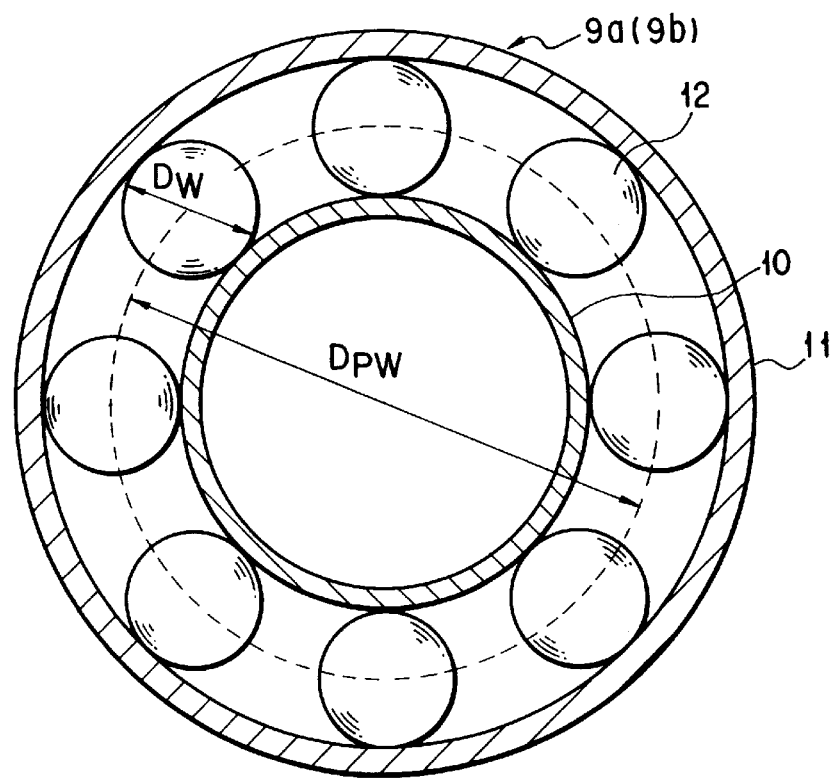
F I G. 3

DATA RECORDING/REPRODUCING APPARATUS HAVING TRACK INTERFERENCE REDUCTION MECHANISM

BACKGROUND OF THE INVENTION

1. Field of the Invention

This invention relates to a data recording/reproducing apparatus using a disklike recording medium such as a magnetic disk, and more particularly to a data recording/reproducing apparatus capable of performing high density recording by effectively reducing the interference between tracks due to the non-repeatable vibration of a spindle motor employed therein.

2. Description of the Related Art

Magnetic disk apparatuses, and in particular hard disk apparatuses are sold with tracks formed on their disks as a result of magnetically recording servo information thereon. To form such tracks in each apparatus as a semi-finished product, a magnetic head installed therein is moved over a magnetic disk mounted on a spindle motor, and is positioned on a certain point on the disk, thereby recording head-positioning information called "servo information" in the form of tracks. The process for recording servo information on a magnetic disk will be referred to as "servo track writing".

In such a servo track write method for forming tracks on a magnetic disk, as the density of tracks is increased so as to increase the recording capacity, adjacent tracks will interfere with each other, i.e. intersect with each other because of vibration of the spindle motor called "non-repeatable vibration". The "non-repeatable vibration" is mainly caused by the movement of balls contained in the ball bearing of the spindle motor, which is called "rolling element vibration". It is known that a minimum frequency component contained in the "rolling element vibration" is due to revolution of balls. For example, it corresponds to a vibration component with a low frequency of about 30 [Hz] and a very large amplitude indicated by the arrow in FIG. 4. This vibration component will occur because of unevenness in size between the balls and often has the largest amplitude among all frequency components of the non-repeatable vibration, as is shown in FIG. 4. The vibration component may well cause the aforementioned interference between adjacent tracks at the time of servo track writing, and hence be a serious obstacle in increasing the density of tracks.

SUMMARY OF THE INVENTION

It is an object of the invention to provide a data recording/reproducing apparatus capable of effectively reducing the interference between tracks due to the non-repeatable vibration of a spindle motor, thereby allowing high density recording.

To attain the object, in a data recording/reproducing apparatus for recording and reproducing data on and from a disklike recording medium while rotating the disklike recording medium by a spindle motor, where the number of rotations per unit time (the rotational frequency) of the spindle motor is represented by F0, and the frequencies of vibration components included in non-repeatable vibration of the spindle motor are represented by F1 (F1≠a×F0, a is an integer), the ratio of a minimum frequency included in the frequencies F1 to (the rotational frequency F0) is set substantially to m/n (m and n are integers). The ratio is, for example, 1/n.

More specifically, in a spindle motor having ball bearings, the minimum-frequency vibration component of the non-repeatable vibration of the motor corresponds to the revolutionary frequency of each ball in the ball bearing, the ratio of the revolutionary frequency of the ball to the rotational frequency of the spindle motor can be set to an integer value by optimizing the size of the ball bearing.

By virtue of the above structure, the influence of the non-repeatable vibration can be reduced in synchronism with every (m×n) or (n) rotations of the spindle motor. Therefore, if servo track writing is performed in synchronism with every (m×n) or (n) rotations of the spindle motor to write servo information, the head position error due to the non-repeatable vibration can be reduced, thereby enabling high density tracks to be formed without interference between adjacent tracks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram, showing a data recording/reproducing apparatus according to the embodiment of the invention;

FIG. 2 is a sectional view, showing an example of a spindle motor;

FIG. 3 is a sectional view, showing a ball bearing appearing in FIG. 2;

FIGS. 6A and 6B are views, useful in explaining a servo track write period in the embodiment.

DETAILED DESCRIPTION OF THE PREFERRED EMBODIMENTS

Figure 4:
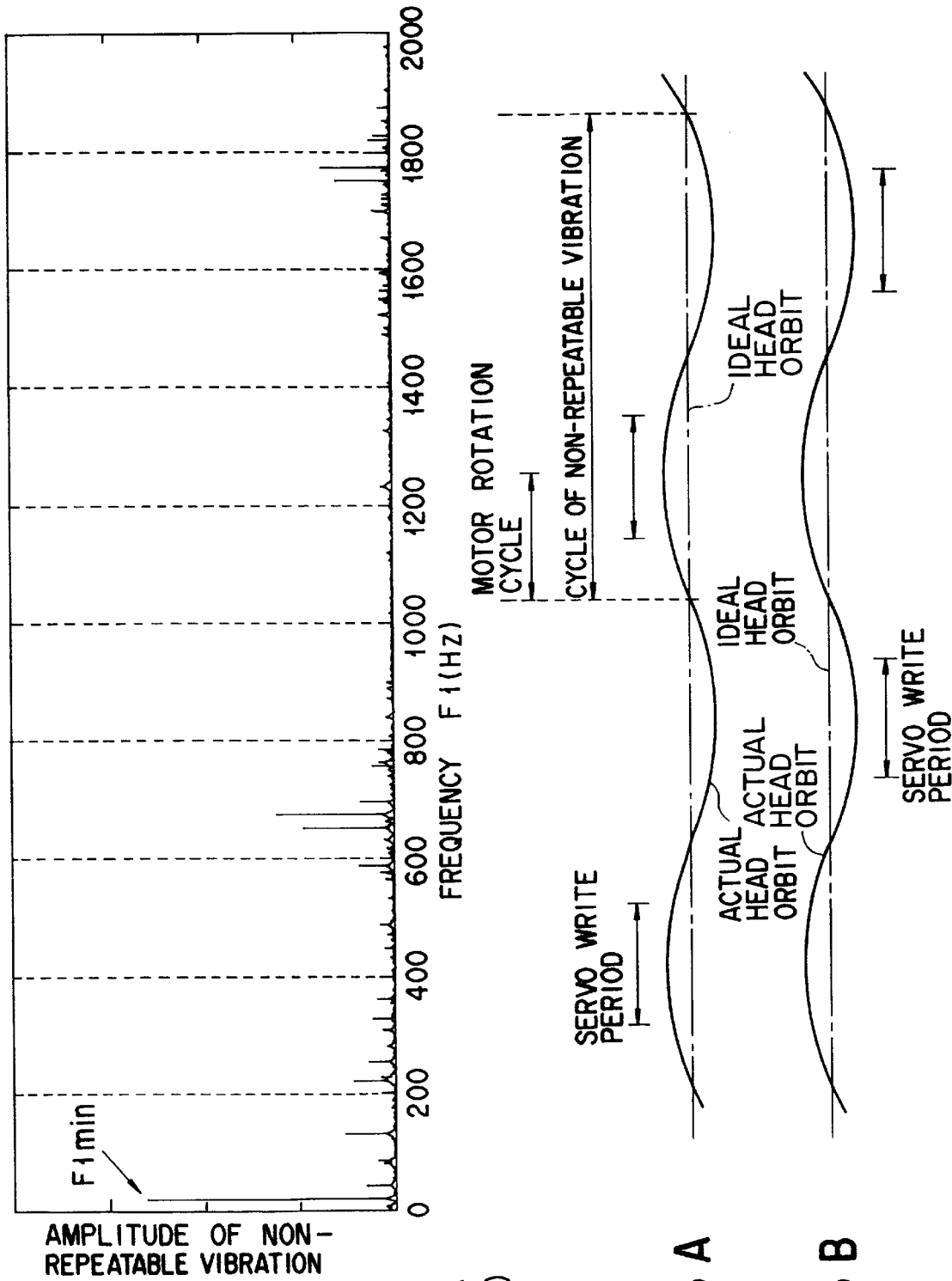
FIG. 4 is a graph, showing an example of the amplitude/frequency characteristic of the non-repeatable vibration of a spindle motor.

The embodiment of the invention will be explained with reference to the accompanying drawings.

Referring first to FIG. 1, the overall structure of a data recording/reproducing apparatus according to the embodiment of the invention will be explained. A disklike recording medium 101 such as, for example, a magnetic disk, is rotated by a spindle motor 102. The spindle motor 102 is rotated by a motor driving circuit 103. The spindle motor 102 will be explained later in detail.

A recording/reproducing head 104 is a magnetic head. The magnetic head may be a single induction type head which can both record and reproduce data, or it can be a more complex head unit which includes both an induction type head used as a recording head and an MR (Magnetic Resistance) head used as a reproducing head. A head actuator 105 is a head driving means for moving the recording/ reproducing head 104 in a radial direction of the magnetic disk 101, and is formed of a rotary actuator using a VCM (Voice Coil Motor) or a linear actuator. An actuator during circuit 106 is responsive to a control signal from a control circuit (not shown) for supplying the head actuator 105 with a driving signal.

The recording/reproducing head 104 is connected to a recording/reproducing circuit 107. The circuit 107 supplies the head 104 with servo information at the time of servo track writing, and with data at the time of data recording. Further, the circuit 107 outputs, as reproduction data, data read from the magnetic disk 101 by means of the recording/reproducing head 104 at the time of data reproduction.

A position data detection circuit 108 detects the position of the head actuator 105, in other words, the position of the recording/reproducing head 104 in a radial direction of the magnetic disk 101. A vibration sensor 109 detects the vibration of the spindle motor 102, using a vibration pickup, an acceleration sensor, means for measuring the displacement of the axis of the spindle motor 102 on the basis of a change in electrostatic capacity, or means for detecting the current of the spindle motor 102.

A signal output from the motor driving circuit 103 to drive the spindle motor 102, a signal output from the position data detection circuit 108 and a signal output from the vibration sensor 109 are input to a calculation circuit 110. The calculation circuit 110 generates servo track write timing information, i.e. information indicative of the timing of writing servo information. The servo track write timing information is supplied to the recording/reproducing circuit 107. A method for generating the servo track write timing information will be explained later.

The spindle motor 102 will now be explained.

FIG. 2 is a sectional view, showing an example of the spindle motor 102. In FIG. 2, reference numeral 1 denotes a motor bracket as a table for the spindle motor 102, reference numeral 2 a seal member, reference numeral 4 a yoke, reference numeral 5 a stator secured to the motor bracket 1, reference numeral 6 a magnet, reference numeral 7 a rotor, reference numeral 8 the rotation axis of the spindle motor, which is to be rotated together with the rotor 7, and reference signs 9a and 9b ball bearings. The ball bearings 9a and 9b are separated from each other by a predetermined distance in the axial direction of the rotation axis 8, and the ball bearings 9a and 9b rotatably support the axis 8 on the motor bracket 1.

As is shown in detail in FIG. 3, each of the ball bearings 9a and 9b comprises an inner ring 10, an outer ring 11, and balls 12 provided therebetween as rolling elements. Each ball bearing further has a ball retainer (not shown) and a sealing member 2 (not shown). The inner ring 10 is fixed to the rotation axis 8 of the motor, while the outer ring 11 is fixed to the motor bracket 1.

While the spindle motor 102 is rotated at a constant speed, each element which constitutes the ball bearings 9a and 9b vibrates with a frequency determined on the basis of its geometric size. This vibration component is a so-called asynchronous component which does not relate to the number of rotations of the spindle motor 102. In other words, vibration component is not a harmonic, of the rotational frequency of the spindle motor. This vibration is generally called "rolling-element passing vibration". Since this vibration component appears when the ball bearing is damaged, it is measured to diagnose such a damage in the ball bearing.

The number of rotations per unit time (rotational frequency) of the ball 12 will be calculated using geometry in a manner described below.

Where the ball 12 is rolled without slippage on a circular orbit defined by the inner and outer rings 10 and 11, the circumferential speed Va of the ball 12 and the number Na of rotations per unit time (rotational frequency Na) of the same can be calculated on the basis of the difference in the number Ni of rotations per unit time (rotational frequency Ni) of the inner ring 10 and the number Ne of rotations per unit time (rotational frequency Ne) of the outer ring 11, in light of the fact that the distance on the orbit of the inner ring 10 through which the ball 12 rolls is equal to that on the orbit of the outer ring 11 through which the ball 12 rolls. Specifically, Va and Na are given by $$Va = \frac{\pi D_w}{60 \times 10^3} \left[ \frac{D_{pw}}{D_w} - \frac{D_w \cos^2 \alpha}{D_{pw}} \right] \frac{Ne - Ni}{2} [m/s] \quad (1)$$

$$Na = \left[ \frac{D_{pw}}{D_w} - \frac{D_w \cos^2 \alpha}{D_{pw}} \right] \frac{Ne - Ni}{2} [Hz] \quad (2)$$

where Dpw represents the pitch diameter [mm], Dw the diameter [mm] of the ball 12, α the angle [deg] of contact, Ni the rotational frequency [Hz] of the inner ring 10, and Ne the rotational frequency [Hz] of the outer ring 11. The angle of contact indicates the amount of axial deviation between the inner and outer rings 10 and 11. If there is no deviation, α=0.

Further, the revolutionary speed Vc of the ball 12 and the number Nc of revolutions per unit time (the revolutionary frequency Nc) of the same are calculated on the basis of the circumferential speed of the orbit of the inner ring and that of the orbit of the outer ring, using the following equations (3) and (4):

$$Vc = \frac{\pi D_{pw}}{60 \times 10^3} \left[ \left[ 1 - \frac{D_w \cos \alpha}{D_{pw}} \right] \frac{N_i}{2} + \left[ 1 + \frac{D_w \cos \alpha}{D_{pw}} \right] \frac{N_e}{2} \right] [m/s] \quad (3)$$

$$Nc = \left[ 1 - \frac{D_w \cos \alpha}{D_{pw}} \right] \frac{N_i}{2} + \left[ 1 + \frac{D_w \cos \alpha}{D_{pw}} \right] \frac{N_e}{2} [Hz] \quad (4)$$

Since in this embodiment, the inner rings 10 of the ball bearings 9a and 9b are coupled with the rotation axis 8 of the spindle motor, the rotational frequency Ni of the inner ring 10 is equal to that of the rotation axis 8. On the other hand, since the outer ring 11 is fixed to the motor bracket 1, the rotational frequency Ne of the outer ring 11 is 0.

FIG. 4 shows the amplitude/frequency characteristics of the non-repeatable vibration of the spindle motor 102, the abscissa indicating the frequency F1 of the vibration, and the ordinate indicating the amplitude of the vibration. In FIG. 4, it is known that a minimum-frequency vibration component Flmin indicated by the arrow relates to the revolutionary frequency Nc of the ball 12 of each ball bearing 9a or 9b, and has a maximum amplitude. In other words, in this case, the minimum-frequency vibration component occupies a largest portion of the non-repeatable vibration. Thus, the minimum-frequency vibration component or the frequency component with the largest amplitude of the non-repeatable vibration corresponds to the number Nc of revolutions (the revolutionary frequency Nc).

This embodiment is characterized in that the revolutionary frequency Nc is set to substantially 1/n (n=1, 2, 3, . . . ) of the rotational frequency F0 (the number of rotations of the rotation axis 8 of the motor per unit time; in the FIG. 2 case, F0=Ni) of the spindle motor 102. To this end, the ball bearings 9a and 9b are constructed to satisfy the following equation (5):

$$\frac{F_0}{N_c} = \frac{F_0}{F_{1\min}} = \frac{N_i}{N_c} = \frac{2 \times D_{pw}}{D_{pw} - D_w \cos\alpha} = n \quad (5)$$

Actually, however, it is expected that the revolutionary frequency Nc will vary within a range of ±5 Hz because of variations in products.

To set the revolutionary frequency Nc of the ball 12 and the rotational frequency F0 of the spindle motor 102 so as to satisfy the equation (5) can provide advantages described below.

If the ball bearings 9a and 9b satisfy the conditions defined by the equation (5), the minimum-frequency vibration component has a frequency which is 1/n of the rotational frequency F0 of the spindle motor 102, which enhances the reproductivity of the non-repeatable vibration. In other words, supposing that the minimum-frequency vibration component is stabilized and occupies greater part of the non-repeatable vibration, vibration components of other frequencies can be ignored. Accordingly, setting the frequency of the minimum-frequency vibration component to a value which is 1/n of the number of rotations per unit time (the rotational frequency) of the spindle motor 102 enables the amplitude and phase of the minimum-frequency vibration component to be synchronized with every n rotations of the spindle motor 102. In this state, interference will not occur between adjacent tracks no matter how large the amplitude of the vibration component is.

Figure 5:
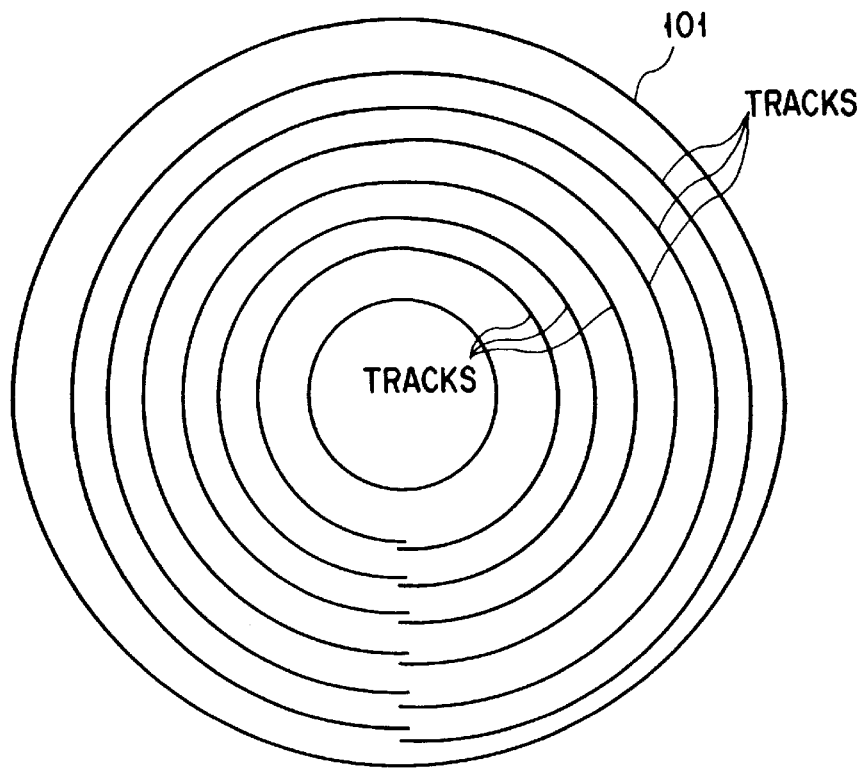
FIG. 5 is a view, showing a track pattern on a magnetic disk incorporated in the embodiment.

FIG. 5 is a view, showing an example of the actual concentric track pattern on the magnetic disk 101. As is evident from FIG. 5, the actual track pattern has misaligned track portions due to the non-repeatable vibration (the minimum-frequency vibration component) of the spindle motor 102. However, the misaligned track portions do not interfere with each other, i.e. do not intersect with each other.

In other words, optimizing the sizes (Dpw, Dw, etc.) of the ball bearings 9a and 9b can cause the spindle motor 102 rotation to be influenced very little by its own non-repeatable vibration. Since a head position error is very small at every n rotations of the spindle motor 102, if servo track writing is performed in synchronism with every n rotations to write servo information, the head position error due to the non-repeatable vibration is reduced, and accordingly high-density tracks can be formed.

FIGS. 6A and 6B are views, useful in explaining the servo track write operation performed in the embodiment, and showing head orbits on the magnetic disk 101. In these figures, the one-dot chain lines indicate ideal head orbits obtained when the spindle motor 102 has no non-repeatable vibration, whereas the solid lines indicate the actual head orbits obtained by considering the influence of the non-repeatable vibration. The head orbits indicated by the solid lines actually correspond to the minimum-frequency vibration component of the non-repeatable vibration which has a frequency substantially equal to ½ of the rotational frequency F0 of the spindle motor 102. As shown in FIGS. 6A and 6B, servo track writing is performed while the actual head orbit deviates from the ideal head orbit to one of side of the inner periphery of the disk and the side of the outer periphery. This can prevent interference between adjacent tracks as shown in FIG. 5. Although in the FIGS. 6A and 6B cases, servo track writing is performed in synchronism with every four rotations (i.e. n=4) of the spindle motor 102, it suffices if the number n is any integer equal to 2 or more.

To realize the above-described servo track write operation, the calculation circuit 110 shown in FIG. 1 calculates the rotational frequency F0 of the spindle motor 102 on the basis of a motor driving waveform signal output from the motor driving circuit 103, and also calculates the minimum-frequency or maximum-amplitude vibration component of the non-repeatable vibration of the spindle motor 102.

The vibration sensor 109 may be formed of a displacement sensor, a speed sensor, an acceleration sensor, etc. In the case of using, for example, the acceleration sensor, an acceleration-sensing IC chip is employed as the vibration sensor 109 in the data recording/reproducing apparatus. The output of the sensor is input to the calculation circuit 110. In this circuit, the frequency of the non-repeatable vibration is calculated in the following manner:

The noise components of the sensor output are removed therefrom by means of a high-pass filter of 2 Hz and a low-pass filter of 10 [kHz], and the noise-removed sensor output is subjected to FFT processing performed by means of a DSP, etc., thereby determining the frequency of the one vibration component contained in the non-repeatable vibration that has a maximum amplitude. Alternatively, the minimum-frequency component is extracted from the non-repeatable vibration by calculating the difference between a component passing a notch filter and a component not passing the notch filter. The notch filter contains an active filter formed of an operation amplifier or a digital filter in the DSP, and uses, as its center frequency, the minimum frequency of the non-repeatable vibration calculated from the number of rotations per unit time (the rotational frequency) of the spindle motor 102 and the size of the bearing, etc., or a particular frequency predetermined from experiments.

When the position of the recording/reproducing head 104 recognized on the basis of position data from the position data detection circuit 108 corresponds to a servo track write period as shown in FIGS. 6A and 6B, the calculation circuit 110 supplies servo track write timing information to the recording/reproducing circuit 107.

Recording timing information such as the servo track write timing information is created by a phase-advance or phase-delay circuit, which detects the phase of a vibration component of a specified frequency and advances or delays the phase by a value predetermined through experiments.

Figure 7:
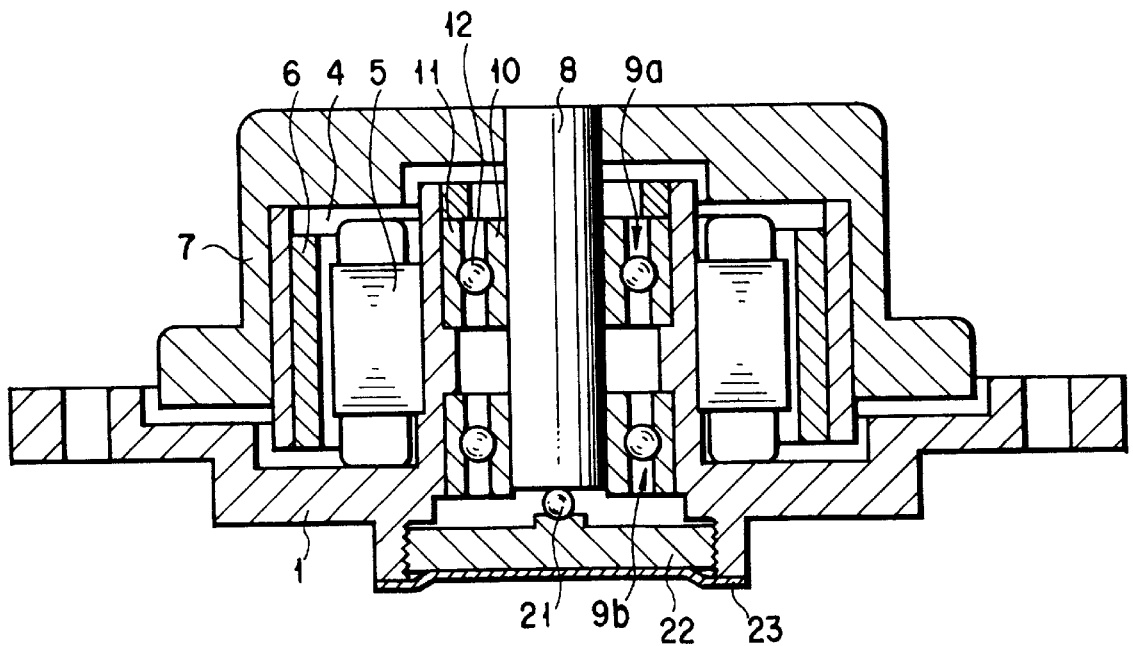
FIG. 7 is a sectional view, showing another type spindle motor.

FIG. 7 shows another structure of the spindle motor 102. This spindle motor 102 has a pre-load variable mechanism for varying the amount of pre-load axially applied to the motor rotation axis 8. The pre-load variable mechanism includes a ball 21 and a bottom plate 22. The base end of the rotation axis 8 is coupled to the bottom plate 22 with the ball 21 interposed therebetween. The bottom plate 22 is screwed in the motor bracket 1. Screwing the bottom plate 22 against the bracket 1 axially applies pre-load to the ball bearings 9 by means of the ball 21. The amount of pre-load can be varied by varying the amount of screwing. The bottom plate 22 is secured to a bottom portion of the bracket 1 by means of a seal member 23. Alternatively, the bottom plate 22 may be adhered to the bracket 1 by an adhesive, or secured thereto by a seal structure using an O-ring.

By virtue of the pre-load variable mechanism provided on the spindle motor 102, pre-load can be applied to the ball bearings 9a and 9b, and further the amount of pre-load applied thereto can be adjusted. Therefore, the vibration of the balls 12 can be stabilized by adjusting the amount of pre-load, irrespective of adhesion defects, product variations, etc.

In the embodiment, the minimum frequency F1min included in the frequencies F1 (F1≠a×F0, a is an integer) of the non-repeatable vibration of the spindle motor is set to a value which is substantially 1/n (n is an integer) of the rotational frequency F0 of the spindle motor. However, if a vibration component of a maximum amplitude included in the vibration components of the frequencies F1, which constitute the non-repeatable vibration, does not have the minimum frequency, a similar effect can be obtained by setting the frequency of the vibration component with the maximum amplitude, to an value which is substantially 1/n of the rotational frequency F0.

Moreover, a similar effect can be obtained by setting, to a substantial integer value, the ratio of the minimum frequency or of the frequency of the vibration component with the maximum amplitude, to F0. For example, suppose that the ratio of the minimum frequency F1min or of the frequency of the vibration component with the maximum amplitude, to F0 is m:n (m and n are integers), i.e. F1min : F0=m:n. If F1min=20 [Hz] and F0=50 [Hz], i.e. if m:n=2:5, the periods of vibration components corresponding thereto are T2=1/F2=50 [msec]. and T0=1/F0=20 [msec]., respectively. In this case, if the servo information is written every 100 [msec]. (which is a least common denominator of 50 [msec]. and 20 [msec].), i.e. written in synchronism with every 5rotations of the motor, the phases of tracks are aligned with each other, and accordingly no interference will occur between the tracks.

In addition, although in the embodiment, the servo information is written on the magnetic disk 101 by means of a data recording/reproducing system employed in the magnetic disk apparatus, a system dedicated to servo track writing may be used as well. In this case, a head for servo track writing, which differs from the recording/reproducing head 104, is used. with respect to a head driving system, too, the head arm may be driven not by the head actuator 105 incorporated in the apparatus, but by an external member.

As explained above, in the data recording/reproducing apparatus of the invention, the ratio of the minimum frequency or of the frequency of the vibration component with the maximum amplitude (specifically, the ratio of the number of revolutions pre unit time (the revolutionary frequency) of each ball in the ball bearing), to the number of rotations pre unit time (the rotational frequency) of the spindle motor is set to a substantial integer value. As a result, the data recording/reproducing apparatus of the invention can avoid interference between adjacent tracks on a disklike recording medium even when high density tracks are formed thereon at the time of servo track writing, and accordingly can perform higher density recording than the conventional apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data recording/reproducing apparatus for recording and reproducing data on and from a plurality of tracks on a rotating disk-like recording medium, the apparatus comprising:
    a spindle motor having a rotational frequency, F0, and having a plurality of frequencies of vibration components in a non-repeatable vibration of the spindle motor which are represented by F1, where F1 ≠ a×F0, a being an integer; and
    wherein a ratio of a minimum frequency of said plurality of frequencies F1 to the rotational frequency F0 is substantially said ratio being defined by integers, to minimize interference between adjacent tracks on the recording medium.

2. The data recording/reproducing apparatus according to claim 1, wherein said ratio of said minimum frequency to said rotational frequency F0 is substantially 1/n.

3. The data recording/reproducing apparatus according to claim 1, further comprising means for repeatedly writing servo track information on the disklike recording medium in synchronism with a predetermined number of rotations of the spindle motor.

4. The data recording/reproducing apparatus according to claim 1, wherein the spindle motor further comprises a variable pre-load mechanism for applying a variable axial force onto a rotation axis of the spindle motor.

5. A data recording/reproducing apparatus for recording and reproducing data on and from a plurality of tracks on a rotating disk-like recording medium, the apparatus comprising:
    a spindle motor having a rotation frequency, F0, and having a plurality of frequencies of vibration components in a non-repeatable vibration of the spindle motor which are represented by F1, where F1 ≠a×F0, a being an integer; and
    wherein a ratio of the frequency of said plurality of frequencies of said vibration components having a maximum amplitude to the rotational frequency F0 is substantially said ratio being defined by integers, to minimize interference between adjacent tracks on the recording medium.

6. The data recording/reproducing apparatus according to claim 5, wherein the ratio of said frequency having a maximum amplitude to F0 is substantially 1/n.

7. The data recording/reproducing apparatus according to claim 5, further comprising means for repeatedly writing servo information on the disklike recording medium in synchronism with a predetermined number of rotations of the spindle motor.

8. The data recording/reproducing apparatus according to claim 5, wherein the spindle motor further comprises a variable pre-load mechanism for applying a variable axial force onto a rotation axis of the spindle motor.

9. A data recording/reproducing apparatus for recording and reproducing data on and from a plurality of tracks on a rotating disk-like recording medium, the apparatus comprising:
    a spindle motor having a ball bearing including a plurality of balls, wherein the ratio of a revolutionary frequency of each of said balls in said ball bearing to a rotational frequency of the spindle motor is set substantially to said ratio being defined by integers, to minimize interference between adjacent tracks on the recording medium.

10. The data recording/reproducing apparatus according to claim 9, wherein the ratio of the revolutionary frequency to the rotational frequency is substantially 1/n.

11. The data recording/reproducing apparatus according to claim 9, further comprising means for repeatedly writing servo information on the disklike recording medium in synchronism with a predetermined number of rotations of the spindle motor.

12. The data recording/reproducing apparatus according to claim 9, wherein the spindle motor further comprises a variable pre-load mechanism for applying a variable axial force onto a rotation axis of the spindle motor.

* * * * *